US011023308B2

(12) United States Patent
Chittigala et al.

(10) Patent No.: US 11,023,308 B2
(45) Date of Patent: *Jun. 1, 2021

(54) TRAFFIC AND GEOGRAPHY BASED COGNITIVE DISASTER RECOVERY

(71) Applicant: International Business Machines Corporation, Armonk, NY (US)

(72) Inventors: Jes Kiran Chittigala, Kukatpally (IN); Santhosh Joshi, Miyapur (IN); Srirama R. Kucherlapati, Telengana (IN)

(73) Assignee: International Business Machines Corporation, Armonk, NY (US)

(*) Notice: Subject to any disclaimer, the term of this patent is extended or adjusted under 35 U.S.C. 154(b) by 17 days.

This patent is subject to a terminal disclaimer.

(21) Appl. No.: 16/444,120

(22) Filed: Jun. 18, 2019

(65) Prior Publication Data

US 2019/0303235 A1 Oct. 3, 2019

Related U.S. Application Data

(63) Continuation of application No. 15/869,174, filed on Jan. 12, 2018, now Pat. No. 10,884,843.

(51) Int. Cl.
*G06F 11/00* (2006.01)
*G06F 11/07* (2006.01)
(Continued)

(52) U.S. Cl.
CPC ...... *G06F 11/0793* (2013.01); *G06F 11/0709* (2013.01); *G06F 11/079* (2013.01);
(Continued)

(58) Field of Classification Search
CPC ............. G06F 11/0793; G06F 11/0709; G06F 11/0751; G06F 11/203; G06F 11/2033
See application file for complete search history.

(56) References Cited

U.S. PATENT DOCUMENTS 7,152,182 B2 12/2006 Ji et al.
10,048,996 B1* 8/2018 Bell ..................... G06F 11/3006
(Continued)

OTHER PUBLICATIONS

List of IBM Patents or Patent Applications Treated as Related, filed Jun. 18, 2019.

*Primary Examiner* — Philip Guyton
(74) *Attorney, Agent, or Firm* — Reza Sarbakhsh; Edell, Shapiro & Finnan, LLC

(57) ABSTRACT

In a system having at least two data storage and processing sites, each capable of alternatively serving as a primary site and a backup or target site, disaster recovery migration is optimized by cognitively analyzing at least one system parameter. Using machine learning, at least one pattern of that system related parameter is predicted, and planned or unplanned migration procedures are performed based on the predicted parameter patterns. The analyzed parameter may be data traffic at the sites, and the predicted data traffic pattern is used to assign primary and backup site status to those sites. The analyzed parameter may be the occurrence of events or transactions at the sites, and the predicted event or transaction patterns may be used to determine times of disaster recovery procedure processing so as to not interrupt a critical event or transaction.

5 Claims, 6 Drawing Sheets

(51) Int. Cl.
*G06N 5/02* (2006.01)
*G06N 20/00* (2019.01)
*G06F 11/20* (2006.01)

(52) U.S. Cl.
CPC ........ *G06F 11/0751* (2013.01); *G06F 11/203* (2013.01); *G06N 5/02* (2013.01); *G06N 20/00* (2019.01)

(56) References Cited

U.S. PATENT DOCUMENTS

| | | |
|---|---|---|
| 10,375,169 B1 | 8/2019 | Diallo et al. |
| 2005/0289391 A1 | 12/2005 | Ichikawa et al. |
| 2008/0262890 A1 | 10/2008 | Korupolu et al. |
| 2009/0070628 A1 | 3/2009 | Gupta et al. |
| 2015/0019195 A1* | 1/2015 | Davis ................. G06F 11/3447 703/17 |
| 2015/0249707 A1 | 9/2015 | Morgan |
| 2016/0034362 A1 | 2/2016 | Al-Wahabi |
| 2016/0057041 A1 | 2/2016 | Gupta et al. |
| 2017/0149624 A1 | 5/2017 | Chitti et al. |
| 2017/0308421 A1 | 10/2017 | Angeles et al. |
| 2019/0171514 A1 | 6/2019 | Chowdhury |
| 2019/0220342 A1* | 7/2019 | Chittigala ........... G06F 11/2094 |
| 2019/0303235 A1* | 10/2019 | Chittigala ........... G06F 11/0709 |

* cited by examiner

TRAFFIC AND GEOGRAPHY BASED COGNITIVE DISASTER RECOVERY

BACKGROUND

1. Technical Field

Present invention embodiments relate to data disaster recovery and, more specifically, to cognitive analysis of operational, environmental and resource parameters to improve the recovery time objective (RTO) and recovery point objective (RPO) in disaster recovery migration procedures.

2. Discussion of the Related Art

Most systems for effecting disaster recovery, whether planned (such as a scheduled site migration) or unplanned (such as an accidental event), provide techniques wherein resources, such as data storage and processing facilities, are automatically replicated and synchronized at a remote backup or target site such that, when a disaster occurs at a primary site, the resources at a target site are brought online. It is generally the goal in disaster recovery systems to provide optimum recovery time objective (RTO) and recovery point objective (RPO). As part of the disaster recovery process, the following issues need to be addressed:

(a) A disaster event may be triggered by and/or involve critical resource errors and, in such cases, any critical transactions running at the time of a disaster recovery procedure might not be completed.

(b) A critical transaction occurring when the system administrator initiates a planned disaster recovery procedure may not be completed.

(c) A high data volume transaction occurring when the system administrator attempts a planned disaster recovery procedure may fail.

(d) In the case of a rolling disaster, the primary site may be gradually failing due to data corruption, viruses, human error, etc., and conventional disaster recovery systems cannot determine the nature or time of the next error.

In addition, if the primary site is online in one geographical location and most of the data traffic is generated from the geographical location where the backup site is configured, the RTO will be directly affected. For example, if the primary site is in India and the backup is in the USA, and if most of the traffic involves the USA site, the disaster recovery configuration is underutilized and can yield a poor RTO. In such cases it would be preferable to have the primary site running at the USA site and backup site in India. Further, if traffic at the USA site is heavier at nighttime and traffic at the India site is heavier during the daytime, a similar situation arises and it would be preferable to alternate the primary and backup sites as appropriate.

SUMMARY

According to the present invention, one or more system parameters are cognitively analyzed and, using machine learning functionalities, emergency and planned disaster recovery procedures are configured in accordance with a predicted status of the analyzed parameter(s).

According to one embodiment of the present invention, source traffic is cognitively analyzed based on geographic location of the source sites and, using machine learning functionality, both planned and unplanned disaster recovery migration procedures are configured in accordance with predicted traffic patterns. In addition, if multiple sites are configured for disaster recovery, a planned rolling migration can be performed based on the traffic pattern.

According to another embodiment, various system parameters, including resources, events and input-output (TO) patterns are cognitively analyzed and processed using machine learning functionalities in order to: (a) make decisions and provide notifications to help administrators decide when to run planned disaster recovery procedures, and (b) permit critical transactions to be completed before a migration procedure is initiated.

In a disclosed embodiment for optimizing disaster recovery procedures in a system having at least two data storage and processing sites, each capable of alternatively serving as a primary site and a backup or target site, at least one system parameter is cognitively analyzed. Using machine learning, at least one pattern of that system related parameter is predicted. Disaster recovery procedures, planned or unplanned, are performed based on the predicted parameter patterns. The analyzed parameter may be data traffic at the two sites, and the predicted data traffic pattern is used to assign primary and backup site status to those sites. The analyzed parameter may be the occurrence of events or transactions at the sites, and the predicted event patterns may be used to determine times of disaster recovery procedure processing so as to not interrupt a critical event or transaction.

BRIEF DESCRIPTION OF THE DRAWINGS

Generally, like reference numerals in the various figures are utilized to designate like components.

DETAILED DESCRIPTION

Figure 1:
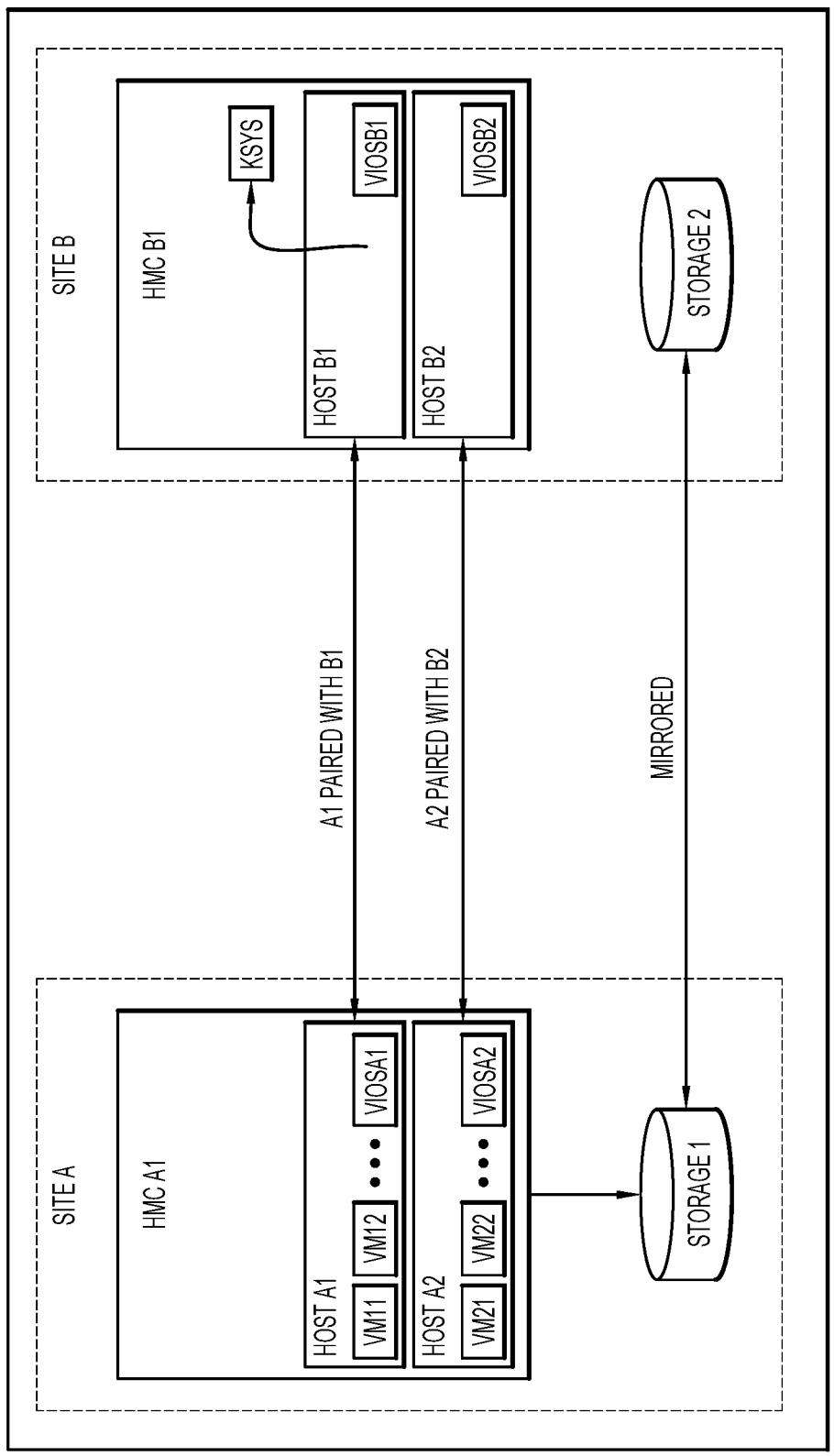
FIG. 1 is a functional block diagram of two sites managed by disaster recovery procedures according to a first embodiment of the present invention.
Figure 2:
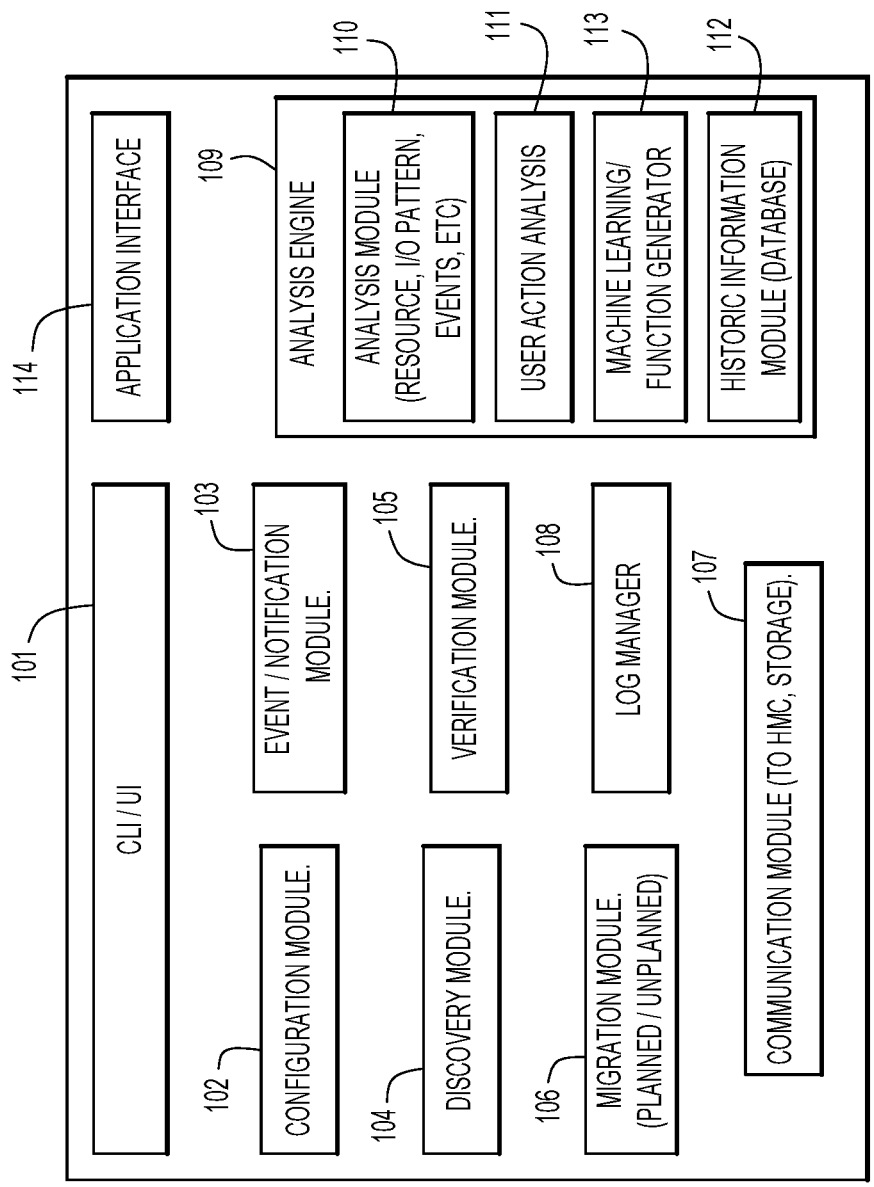
FIG. 2 is a block diagram illustrating the modules employed to effect cognitive analysis for the disaster recovery procedures of the first embodiment of the present invention.
Figure 3:
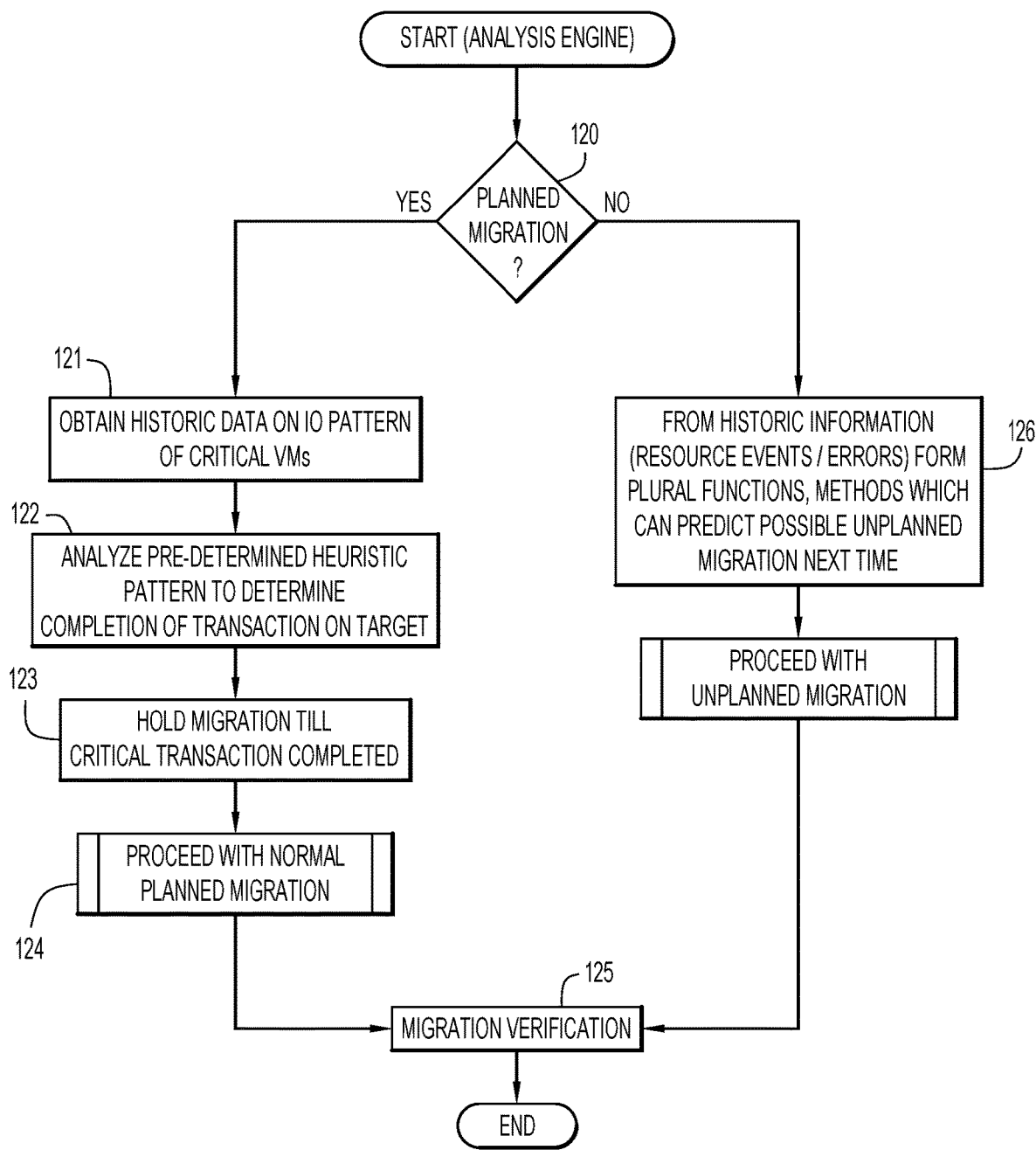
FIG. 3 is a flow chart illustrating operation of the disaster recovery procedures of the first embodiment of the invention.

Reference is now made to FIGS. 1-3 which illustrate a first example of a cognitive rolling disaster recovery solution comprising an orchestrator node or control system KSYS in which a manager application functions. In FIG. 1 the control system KSYS is shown managing two data sites A and B which are logical entities and may be comprised of hardware management consoles (HMC A1 and HMC B1), hosts (Host A1, Host A2, Host B1 and Host B2), virtual I/O servers (VIOSA1, VIOSA2. VIOSB1 and VIOSB2), and virtual machines (VM11, VM12, VM21, VM22) as its resources. The hosts at a primary site are paired with the hosts of a target site such that, for planned or unplanned disaster recovery procedures, the VMs belonging to the primary host will be brought up on the paired host at the target site.

The embodiment includes various modules as shown in FIG. 2. A user can specify the site (e.g., site A), HMC, host and the paired host information using interface 101 (a user interface UI or command line interface CLI) supported by the control system KSYS under the control of the configuration module 102 that controls this resource configuration. The KSYS can register itself to receive events-related information from the HMC, and the events are processed in the events module 103. Once the configuration is completed, a process is initiated to discover resources such as VMs, VIOS, storage VM to disk mapping and finding the replicated disk in site B. This is performed by the discovery module 104. Once resource discovery is completed, the verification module 105 performs various checks at the target site B to confirm if the target Site is ready to take the workload from primary site A. Upon verification completion the user can conduct a planned or unplanned migration to the target site by means of the migration module 106. The communication module 107 helps the control system (KSYS) to communicate with the HMC and storage devices through standard supported communication mechanisms such as REST, SSH, etc. The KSYS can query or run operations on HMC or storage devices through this communication module. Log management is effected by the log manager module 108.

The cognitive analysis engine module 109 (e.g., the Watson™ system developed by International Business Machines Corporation) uses machine learning functionalities and algorithms to learn about the configured resources and derive heuristic information governing the various decisions that can be made or fed to the user who can thereby make appropriate decisions. Module 109 is comprised of sub-modules such as an analysis module 110 which analyzes the configured resource, its IO pattern, events, etc. User action analysis module 111 analyzes user actions and performs appropriate functions. For example, if the user triggers a planned migration, module 111 analyzes the heuristic information and allows critical IO data to be completely replicated on the target disk so that a migration can then be initiated. As another example, if the user triggers unplanned migration based on certain failures, module 111 can treat that event or failure as critical and also determine which rolling events can lead to this failure.

Historic information module 112 is primarily a database that stores all the information such as resource changes, resource errors/events, user actions, disaster recovery events, etc., beginning at the installation time. Machine learning module 113 uses algorithms, historic data, and current data and derives the model comprised of a plurality of functions through which certain informal decisions can be made.

An application interface module 114 functions to feed the information to the analysis engine 109, and can be configured to receive the information/inputs or instructions from or to the user and pass on the decisions to KSYS modules to perform the disaster recovery operations.

Operation at the analysis engine 109 for planned and unplanned rolling disaster migration proceeds as diagrammatically illustrated in the flow chart of FIG. 3. A determination is made at step 120 as to whether an initiated disaster recovery migration process is planned or unplanned. If planned, the data reflecting the history of IO patterns at critical virtual machines (VMs) is obtained at step 121. That data is analyzed at step 122 for predetermined heuristic patterns to determine if there has been a completion or absence of a transaction at the target site. At step 123 the disaster recovery migration is delayed until a critical current transaction has been completed. Once the transaction has been completed the planned migration proceeds at step 124 and is verified at step 125.

If the initiated disaster recovery migration process is determined to be unplanned at step 120, historic system parameters and information are analyzed at step 126 to form a plurality of functions and methods that predict the time of the next permissible unplanned migration. When that time occurs the unplanned migration is permitted to proceed at step 127, and completion of that migration is verified at step 125.

Figure 4:
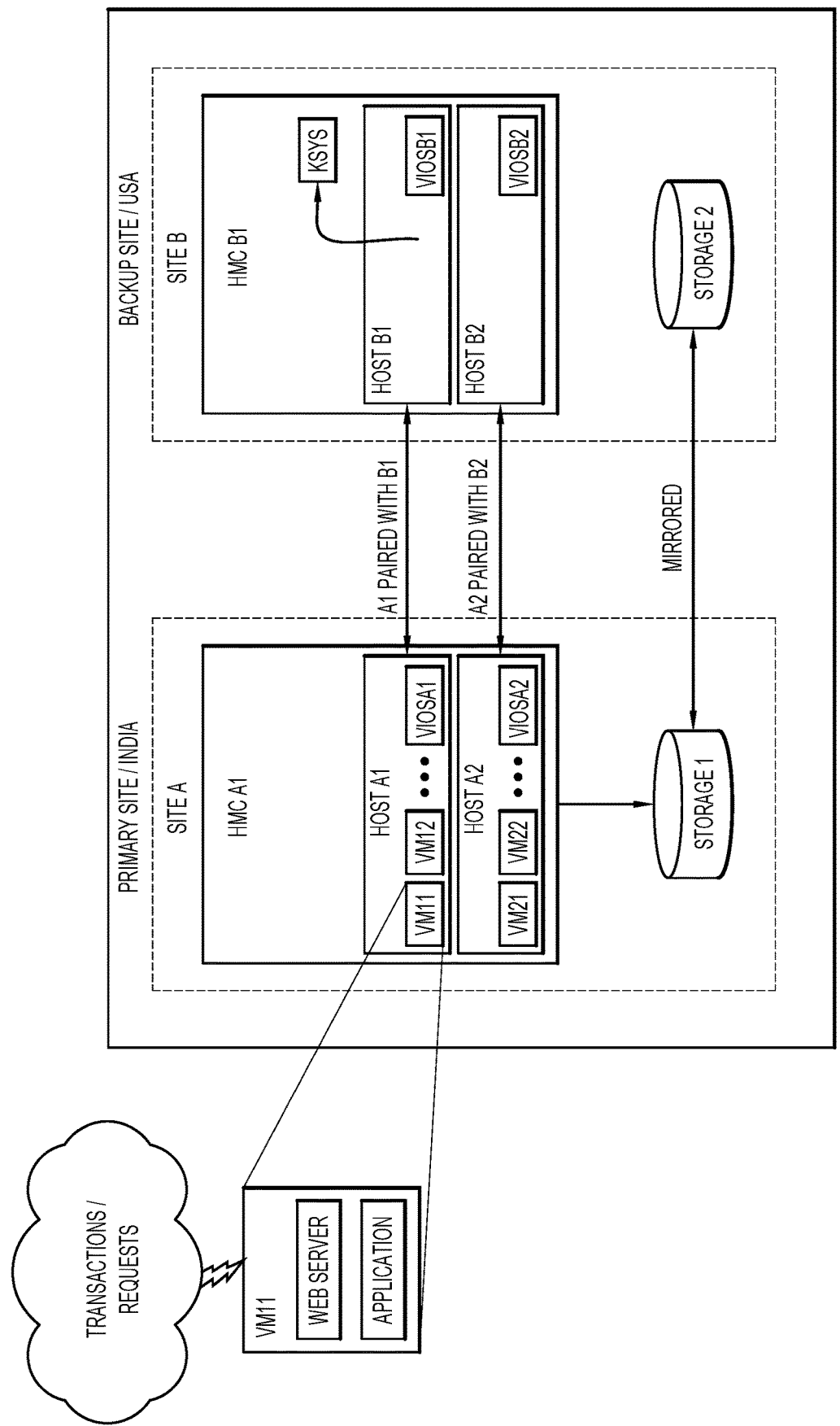
FIG. 4 is a functional block diagram of two sites managed by disaster recovery procedures according to a second embodiment of the present invention.
Figure 5:
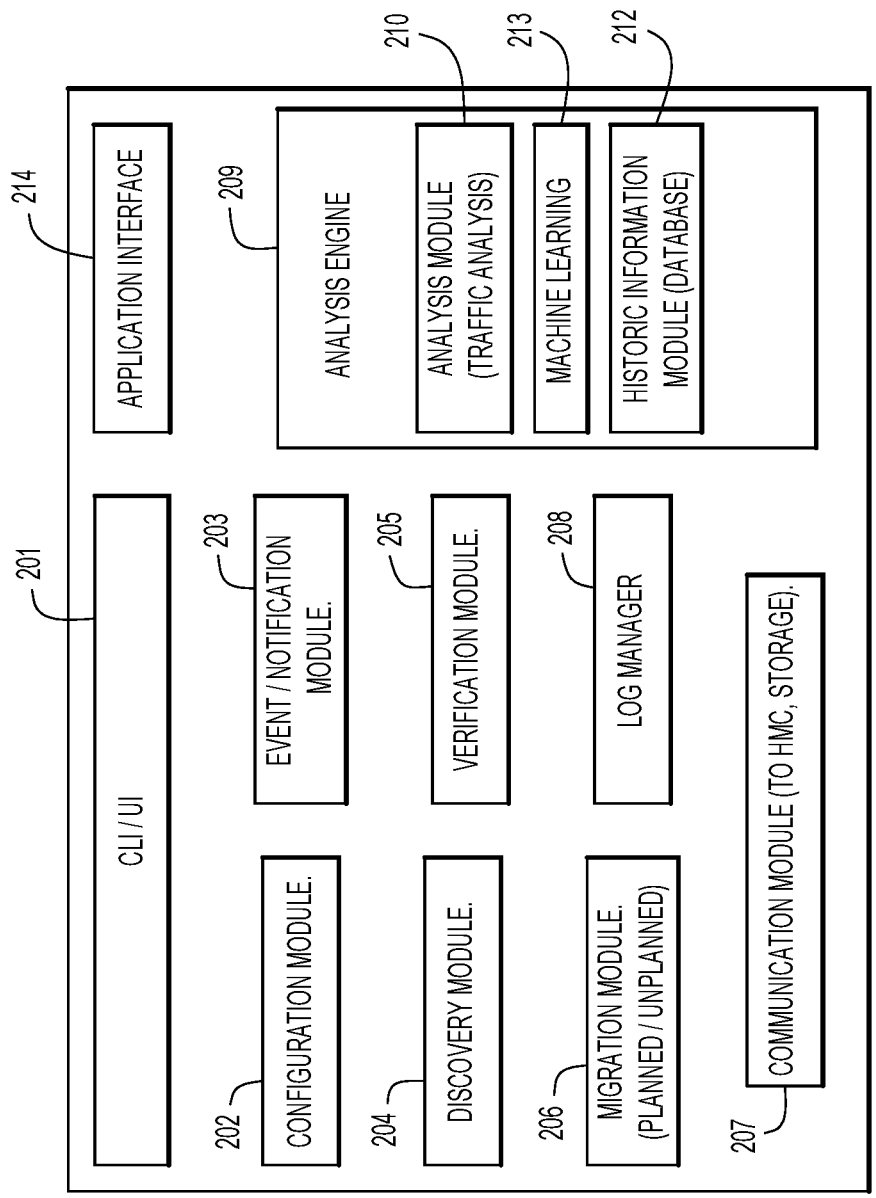
FIG. 5 is a block diagram illustrating the modules employed to effect cognitive analysis for the disaster recovery procedures of the second embodiment of the present invention.
Figure 6:
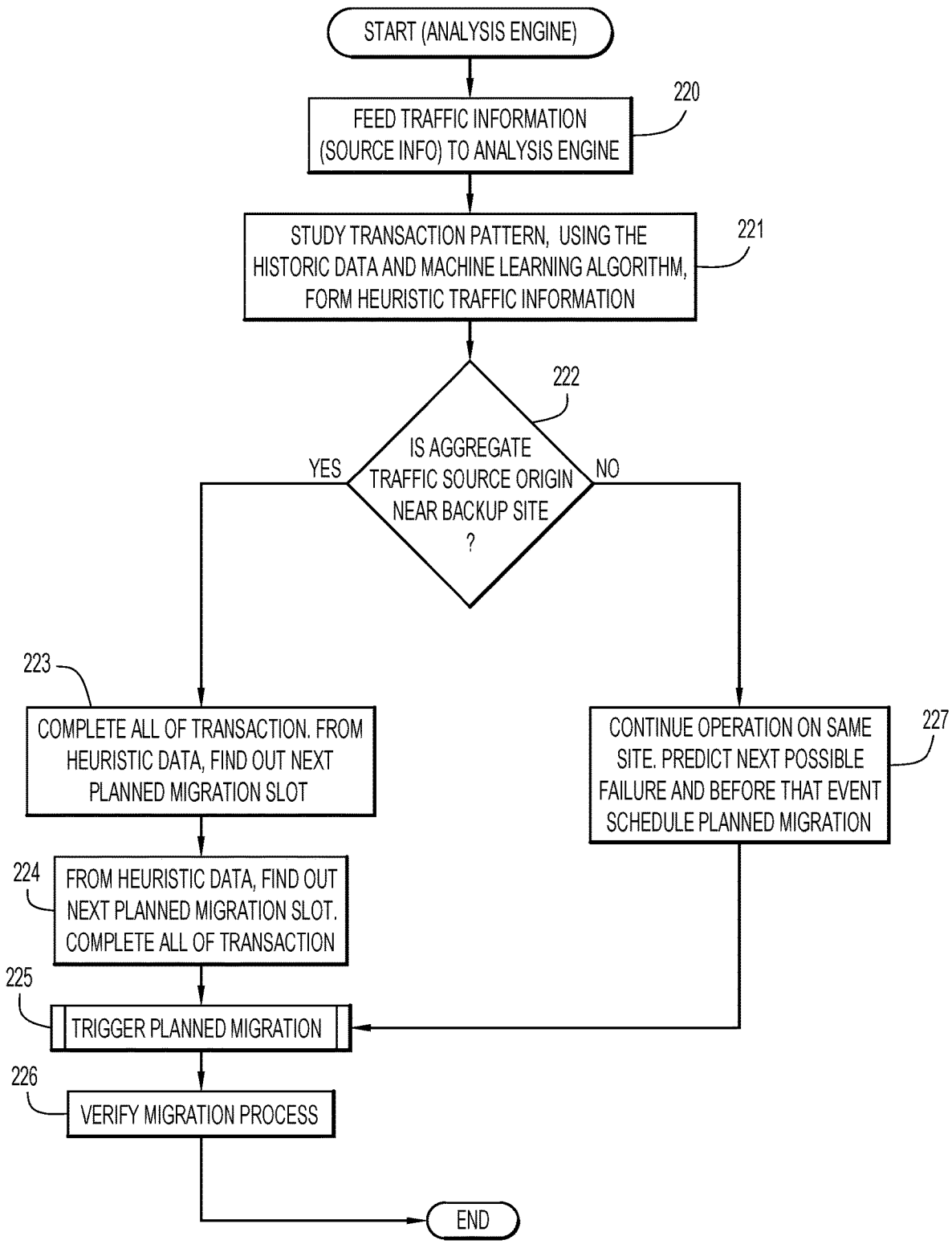
FIG. 6 is a flow chart illustrating operation of the disaster recovery procedures of the second embodiment of the invention.

Reference is now made to FIGS. 4-6 which illustrate a second example of a cognitive disaster recovery solution comprising an orchestrator node or control system KSYS in which a manager application functions. In FIG. 4 the control system KSYS is shown managing two data sites A and B which are logical entities and may be comprised of hardware management consoles (HMC A1 and HMC B1), hosts (Host A1, Host A2, Host B1 and Host B2), virtual I/O servers (VIOSA1, VIOSA2. VIOSB1 and VIOSB2), and virtual machines (VM11, VM12, VM21, VM22) as their resources. The hosts from a primary site are paired with the hosts of a target site such that, for planned or unplanned disaster recovery procedures, the VMs belonging to the primary host will be brought up on the paired host at the target site. Applications with webservers will be running on their VMs (e.g., VM11) that will serve the transactions and requests.

The system includes various modules as shown in FIG. 5. A user can specify the site (e.g., site A), HMC, host and the paired host information using the user interface UI or command line interface CLI 201 supported by the control system KSYS under the control of the configuration module 202 that controls this resource configuration. The KSYS can register itself to receive events-related information from the HMC, and the events are processed in the events module 203. Once the configuration is completed, a process is initiated to discover the resources such as VMs, VIOS, storage VM to disk mapping and finding the replicated disk in site B. This is performed by the discovery module 204. Once discovery is completed, the verification module 205 performs various checks at the target site B to confirm if the target Site is ready to take the workload from primary site A. Upon verification completion the user can conduct a planned or unplanned migration to the target site by means of the migration module 206. The communication module 207 helps the control system (KSYS) to communicate with the HMC and storage devices through standard supported communication mechanisms such as REST, SSH etc. The KSYS can query or run operations on HMC or storage devices through this communication module. Log management is effected by the log manager module 208.

The cognitive Analysis Engine module 209 (e.g., the Watson™ system developed by International Business Machines Corporation) uses machine learning algorithms and functionalities to learn about data traffic information and derives heuristic information regarding traffic pattern predictions. Based on this heuristic information, the decision can be made to do the planned migration. Module 209 also studies the RTO achieved during each migration and uses this to determine when and how to perform subsequent migrations. Module 209 can also predict the next error that can trigger unplanned disaster recovery migration and, based on the predictions, it can stop all transactions and determine when to trigger a planned migration to the backup site. By migrating to the location where more traffic is generated, the system can avoid network congestion issues and achieve better RTO. Further, if the sites are spread across the multiple geographic locations (i.e., a multi-site configuration) the same logic is applied to conduct planned rolling migration from site to site based on the traffic flow.

Module 209 is comprised of sub-modules such as an analysis module 210 which analyzes the configured resource, its IO pattern, events, etc. Historic information module 212 is a database that stores all the information such as resource changes, resource errors/events, user actions, disaster recovery events, etc., beginning at the installation time. Machine learning module 213 uses algorithms, historic data, and current data and derives the model comprised of a plurality of functions through which certain informal decisions can be made.

An application interface module 214 functions to feed the information to the analysis engine 209, and can be configured to receive the information/inputs or instructions from or to the user and pass on the decisions to KSYS modules to perform the disaster recovery operations.

Operation at the analysis engine 209 for effecting disaster recovery migration is illustrated in the flow chart of FIG. 6. More particularly, data traffic information is fed to the analysis engine at step 220. At step 221 the traffic patterns are studied and, using historic data, the machine learning algorithms and functionalities derive heuristic traffic information suitable for predicting traffic patterns. At step 222 a determination is made as to whether or not the source of existing aggregated traffic is near the backup site. If it is, at step 223 the current transaction is completed and a next possible time slot for a planned migration is determined. At step 224, using the heuristic data, determining the next planned migration based on completion of all current transactions. The planned migration proceeds at step 225 and verified at step 226.

If at step 222 it is determined that the source of existing aggregated traffic is not near the backup site, operation continues on the same site at step 227. The time of occurrence of the next possible failure is predicted based on the heuristic traffic pattern data, and a planned migration is scheduled to take place before the time of that predicted failure.

The embodiments described above pertain to controlling disaster recovery migrations, either planned or unplanned, by studying system parameters and predicting parameter patterns using machine learning. The predicted parameter patterns are then used if and/or when disaster recovery migration should take place. It will be appreciated that the embodiments described above and illustrated in the drawings represent only a few of the many ways of implementing embodiments for effecting these functions.

It is to be understood that the term "module" as used herein may include one or more modules or units to perform the various functions of the present invention embodiments described above. The various modules may be implemented by any combination of any quantity of software and/or hardware modules or units.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, profile generation module, profile comparison module, etc.). These systems may include any types of monitors and input devices (e.g., keyboard, mouse, voice recognition, etc.) to enter and/or view information.

It is to be understood that the software of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computers or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

Communication networks employed in the invention may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information. The database system may be implemented by any number of any conventional or other databases, data stores or storage structures (e.g., files, databases, data structures, data or other repositories, etc.) to store information. The database system may be included within or coupled to the server and/or client systems. The database systems and/or storage structures may be remote from or local to the computer or other processing systems, and may store any desired data and data format.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for optimizing disaster recovery migration in a system having first and second remote data storage and processing sites each capable of alternatively serving as a primary data storage and processing site and a backup data storage and processing site, said method comprising the steps of:
   cognitively analyzing at least one system related parameter during system operation, wherein said at least one system related parameter includes data traffic at said first and second sites;
   from the analyzed system related parameter predicting, using machine learning, one or more patterns of said data traffic; and
   performing disaster recovery migration procedures based on said one or more predicted patterns, wherein performing said disaster recovery migration procedures includes:
      determining that said one or more predicted patterns indicate greater data traffic near said second site serving as a backup site of said first site;
      determining a next time slot for performing a migration based on said one or more predicted patterns and a time of completion of all current transactions; and
      performing said migration at said next time slot by switching said second site from the backup site of said first site to a primary site and switching said first site from a primary site to a backup site of said switched second site.

2. The method of claim 1, wherein said one or more predicted patterns include predicted data traffic patterns at said first and second data storage and processing sites.

3. The method of claim 2, wherein the step of performing the disaster recovery migration procedures includes determining a location of incoming data traffic and using that location to identify a nearest site at which to effect a disaster recovery data migration.

4. The method of claim wherein the step of performing the disaster recovery migration procedures includes analyzing said data traffic patterns and performing a planned disaster migration to the data storage and processing site providing an optimum Recovery Time Objective (RTO).

5. A method for optimizing disaster recovery migration in a system having at least two data storage and processing sites each capable of alternatively serving as a primary data storage site and a backup data storage site, said method comprising the steps of:
   cognitively analyzing at least one system related parameter during system operation, wherein said at least one system related parameter includes an occurrence of a critical data transaction;
   from the analyzed system related parameter predicting, using machine learning, one or more patterns of said system related parameter, wherein said predicting includes predicting the time required to complete a currently active data transaction; and
   performing disaster recovery migration procedures based on said one or more predicted patterns, wherein the step of performing includes delaying disaster recovery migration procedures until the predicted time of completion of the currently active data transaction and then performing the disaster recovery migration procedures.

* * * * *